United States Patent
Patterson et al.

(10) Patent No.: US 12,552,689 B2
(45) Date of Patent: Feb. 17, 2026

(54) SLEEVE BREAK DETECTOR FOR UV DISINFECTION SYSTEM LAMP ASSEMBLY

(71) Applicant: Xylem Europe GmbH, Schaffhausen (CH)

(72) Inventors: Charlie Patterson, Cambridge (GB); Mike Cantor, Cambridge (GB); Ray Burn, Suffolk (GB)

(73) Assignee: XYLEM EUROPE GmbH, Schaffhausen (CH)

( * ) Notice: Subject to any disclaimer, the term of this patent is extended or adjusted under 35 U.S.C. 154(b) by 760 days.

(21) Appl. No.: 17/608,378

(22) PCT Filed: Dec. 23, 2019

(86) PCT No.: PCT/EP2019/086946
§ 371 (c)(1),
(2) Date: Nov. 2, 2021

(87) PCT Pub. No.: WO2020/221472
PCT Pub. Date: Nov. 5, 2020

(65) Prior Publication Data
US 2022/0212960 A1  Jul. 7, 2022

(30) Foreign Application Priority Data
May 2, 2019 (GB) ..................... 1906218

(51) Int. Cl.
*C02F 1/32* (2023.01)
(52) U.S. Cl.
CPC ...... *C02F 1/325* (2013.01); *C02F 2201/3227* (2013.01); *C02F 2201/326* (2013.01); *C02F 2209/03* (2013.01); *C02F 2303/14* (2013.01)
(58) Field of Classification Search
None
See application file for complete search history.

(56) References Cited

U.S. PATENT DOCUMENTS

| | | | |
|---|---|---|---|
| 2005/0025663 A1* | 2/2005 | Burke | A61L 2/16 422/28 |
| 2008/0008632 A1* | 1/2008 | Engelhard | C01B 13/10 422/186.3 |
| 2016/0290697 A1* | 10/2016 | Broadbent | B08B 9/00 |

FOREIGN PATENT DOCUMENTS

| | | | | |
|---|---|---|---|---|
| DE | 102016124140 A1 * | 6/2018 | | B60K 15/035 |
| JP | 0957023 A | 3/1997 | | |

(Continued)

OTHER PUBLICATIONS

International Preliminary Report on Patentability for International Application No. PCT/EP2019/086946, dated Nov. 2, 2021, 12 pages.

(Continued)

*Primary Examiner* — Andrew Smyth
(74) *Attorney, Agent, or Firm* — Buchanan Ingersoll & Rooney PC

(57) ABSTRACT

A UV disinfection system including at least one UV lamp assembly with a sleeve surrounding a UV lamp and defining an inner volume. The UV disinfection system further includes at least one pressure sensor. At least one non-return valve connects the inner volume of the at least one sleeve to the pressure sensor. The UV disinfection system is configured to detect a sleeve breakage by the resulting change in pressure at the at least one pressure sensor. A break detection device for a UV disinfection system with a pressure detector includes at least one tubing which communicates directly or indirectly with an inner volume of a sleeve surrounding at least one of a UV lamp unit.

16 Claims, 4 Drawing Sheets

(56) References Cited

FOREIGN PATENT DOCUMENTS

| | | | |
|---|---|---|---|
| JP | 3683949 B2 * | 8/2005 | |
| JP | 3940685 B2 * | 7/2007 | ............. C02F 1/325 |

OTHER PUBLICATIONS

International Search Report and Written Opinion for International Application No. PCT/EP2019/086946, dated Jun. 29, 2020, 16 pages.

* cited by examiner

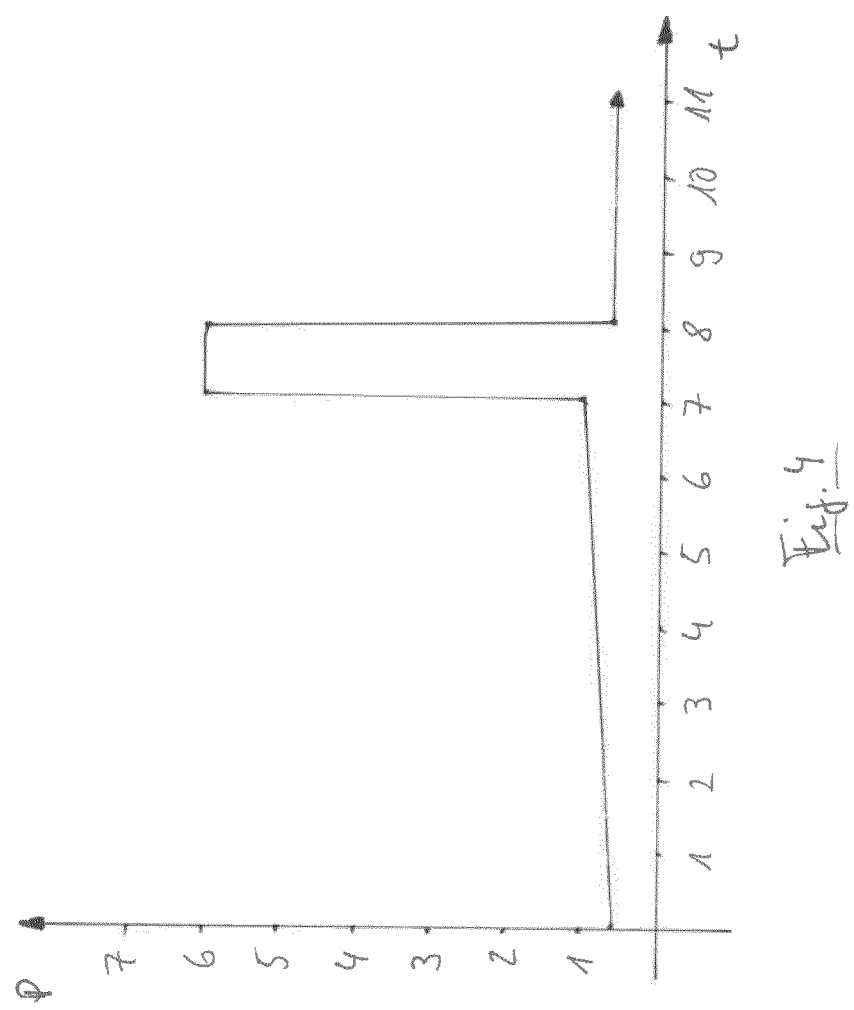

SLEEVE BREAK DETECTOR FOR UV DISINFECTION SYSTEM LAMP ASSEMBLY

CROSS-REFERENCE TO RELATED APPLICATIONS

This patent application is a U.S. National Phase Application of PCT Application No. PCT/EP2019/086946, filed Dec. 23, 2019, which claims the benefit of GB Patent No. 1906218.1, filed May 2 2019, each of which is incorporated by reference herein in its entirety.

FIELD OF THE INVENTION

The present invention relates to a UV disinfection system having at least one UV lamp assembly with a sleeve surrounding a UV lamp, a glass break detection system for a UV disinfection system, an end piece of a lamp and sleeve assembly in a UV water disinfection system and to a UV water treatment plant with a glass break detection device.

BACKGROUND

Ultraviolet radiation (in the following abbreviated "UV") is an electromagnetic radiation with a wavelength between 100 nm and 380 nm. This radiation has a so-called germicidal effect on the DNA of bacteria, viruses and the like.

UV based water treatment plants are cost effective means of biological control both on the drinking water supply side and final stage of sewage treatment before release. These devices typically make use of glass UV discharge lamps, enclosed within a quartz glass sleeve to keep the water being treated away from the lamp and electrical connections. In this connection, the term "glass" shall comprise silica-based glasses and especially quartz glass, which is almost pure $SiO_2$ and which is preferred because of its high transparency for UV radiation.

Occasionally the quartz sleeve tubes break, and it is important to shut down the system. On the drinking water supply side it is important that in this event the water supply from the affected UV treatment element is shut off promptly to avoid glass and, in case that also the lamp glass breaks, possibly mercury entering the supply. These water supply systems are typically run at 2 to 5 bar water pressure.

Within the UV disinfection industry, systems to detect sleeve breaks that rely on the electrical conductivity of water entering the sleeve are common. These work either by sensing resultant ground current from the lamp drivers once water forms a circuit from the lamp terminals to the metal of the reactor housing (sometimes referred to as an earth leakage fault); or alternatively having a water detector installed for this purpose within each sleeve; using either resistive, capacitive, infra-red or other detection technology. All these approaches rely on the water getting to the detector or forming a bridge between suitable bare wires to cause an earth fault event. Depending on the type of break, this can take considerable time, and in some circumstances may not happen at all due to airlocks preventing water from getting to the required place for detection, particularly in installations installed at an angle to the horizontal.

The volume between the lamp and the sleeve tube is usually at a different pressure than the water body surrounding the sleeve tube. It is therefore one approach to detect the increase of pressure in this volume once the sleeve tube breaks. To this end, JPH0957023 discloses a single lamp system in which one electronic pressure sensor is placed inside said volume and is read out by a control device. This system is complicated, especially when it is scaled up to more than one lamp because of the proposed type of sensor and the associated electronic read-out. False alarms may therefore occur.

It is an object of the present invention to provide a system to reliably detect sleeve tube breaks with low false alarm rate.

SUMMARY OF THE INVENTION

This object is solved by a UV disinfection system, by a glass break detection system, by an end piece and by a UV water treatment plant with a glass break detection device.

In a UV disinfection system having at least one UV lamp assembly with a glass sleeve, wherein glass sleeve breaks are detected by the resulting change in pressure within the glass sleeve, the object is solved by connecting multiple glass sleeves in a single system by tubing via non return valves to a pressure sensing means. Thus, it is not necessary to provide each lamp assembly with a separate pressure sensing means. Additionally, the pressure sensing means can be positions at a remote location and thus be less subjected to the harsh conditions that may be present in the vicinity of the lamp assembly.

In a preferred embodiment, the pressure sensing means is a pressure switch which is provided for detecting the change in pressure and for providing an alarm to a user. Such switches are operated solely by the applied pressure and thus work reliably, even without and direct supply voltage that is necessary for most other pressure sensing means.

It is preferred for the same reasons that the alarm is a passive system that provides an open or closed contact to a subsequent user operated controller.

Shutting off the fluid stream through the system is made quick and reliable if a fluid inlet valve for controlling fluid entering the device and/or a fluid outlet valve for controlling fluid leaving the device are provided. It is preferred that the fluid inlet valve and/or the fluid outlet valve are controlled directly or indirectly by the pressure switch.

In a glass break detection device for a UV disinfection system with a pressure detection means, the device comprises at least one pneumatic tubing which is prepared to be attached to an inner volume of a sleeve tube of a UV lamp unit. Thus, the pressure can directly be monitored and used to actuate a remotely located pressure sensing means, which may be mounted in a controlled environment that ensures long service life of the pressure sensing means.

It is preferred that more than one pneumatic tubing are provided, wherein each tubing is pneumatically connected to a manifold having two or more pneumatic ports. This way, more than one lamp assembly can be controlled by one individual pressure sensing means.

In a preferred embodiment, each pneumatic tubing is connected to a non-return valve so that a fluid can unidirectionally pass from the tubing into the manifold. The non-return valve of each line may for example be attached to the lamp assembly or to the manifold and has two effects. First of all, when a glass break occurs and pressurized fluid enters the manifold, this fluid cannot flood the other lamp assemblies. Secondly, the volume inside the manifold that is pressurized in the occasion of a glass break is kept small because the other pneumatically parallel tubings and lamp assemblies are not pressurized. Therefore, the rise in pressure is sharper and can be detected by technical means more precisely and reliably.

If the manifold is pressurized for any reason, it is advantageous if the manifold is provided with a pressure release valve adapted to de-pressurize the manifold. This feature can be viewed as a kind of a mechanical reset after a pressurization event.

In a preferred embodiment, the manifold is provided with a pressure test port adapted to pressurize the manifold. Such a test port can be used to pressurize the manifold using a compressor or even a manually operated pump. It is then possible to check the function of the pressure sensing means and, in case of a switch, the operating threshold.

The object is also solved by an end piece of a lamp and sleeve assembly in a UV water disinfection system, which is fitted with a pneumatic connection port. Such end pieces may for example be used to convert a conventional lamp assembly, in which the interior volume of the glass sleeve tube is hermetically sealed from the surrounding environment, into a lamp assembly that is suited for use with a glass break detection system as described above.

Finally, the object is solved by a UV water treatment plant with a glass break detection device which has been described above in greater detail. Such water treatment plant can quickly and reliably detect glass break and, if necessary, shut off the fluid flow through the plant. If the plant operates a number of parallel UV disinfection systems, the affected system can be shut off and another parallel system can be started to handle the incoming water flow so that the plant can continue to operate almost without interruption.

The system disclosed here relies on detecting the pressure rise in the volume inside the sleeve tube when a sleeve break occurs. This has the advantage that in the event of a sleeve break, the pressure will rise to that of the water in the reactor, independent of the location of the pressure tap and any airlocks that may be present.

In an embodiment, a pneumatic line from each of the end adaptors is run to a central manifold with a non-return valve for each line, the output of which is connected via a manifold to a pressure switch, providing relay contacts to give the sleeve break alarm to the system user.

The non-return valves prevent air from one sleeve filling into the others, which would slow down the response, and mean a single disconnected pneumatic fitting would remove protective monitoring from several lamps, unless a separate pressure switch was attached to each pneumatic line.

Testing the system can easily be done at various levels—the manifold can have a spare port where test pressure can be applied. If desired a more thorough check can be done of each lamp assembly; the pneumatic lines can be disconnected from the ports on the end adaptors in turn—pressure then applied to the line to check line integrity, manifold and relay function, also into the sleeve assembly to check sealing. These checks can be carried out in regular service.

In an alternate embodiment a separate normally closed pressure switch can be attached to each end adaptor, electrically linked to give the alarm in the normal series connected safety relay manner.

A further alternative, pneumatic lines from each lamp assembly still run back to a single manifold, but each line has its own pressure switch, combined electrically in series as above.

Instead of providing a separate controller for the glass break detection system, the glass break sensing and alarm generation could also be done by the UV treatment electronics unit. This is generally not preferred, as it may rely on power being available. In a real commercial embodiment, each UV disinfection system may for example comprise 72 lamp units or even more, and four or more of these systems may be installed in parallel in a full-scale UV disinfection plant.

It is a major commercial benefit that this system that detects pressure is not relying on the lamp being active to detect a sleeve break. This means that if a lamp fails, a sleeve break will be reported where a conventional electric ground fault detection system will not raise an alarm.

BRIEF DESCRIPTION OF THE DRAWINGS

In the following, embodiments are described referring to the drawing, which show:

FIG. 4: a schematic pressure vs. time diagram showing pressure inside the manifold in normal operation and in a sleeve break incident.

DETAILED DESCRIPTION OF THE DRAWINGS

Figure 1:
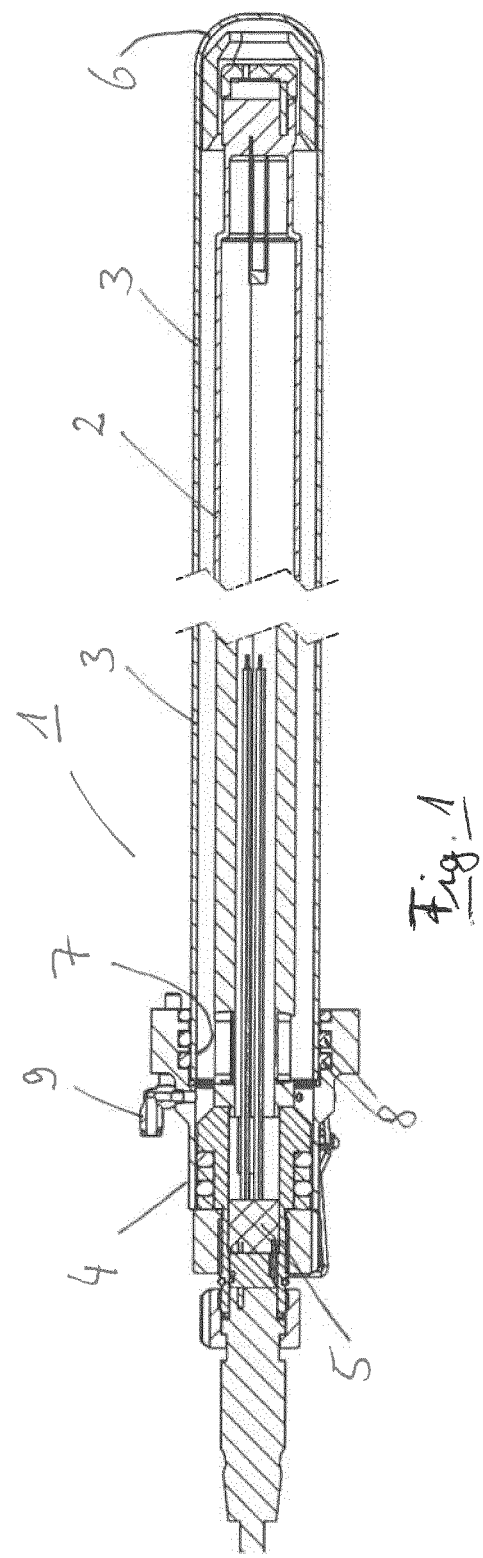
FIG. 1: a single lamp assembly with a port to be connected to an associated glass break detection device.

FIG. 1 shows a single UV lamp assembly with a port to be connected to an associated glass break detection device. In greater detail, the lamp assembly 1 comprises an elongate ultraviolet lamp 2 which is housed in a sleeve tube 3, which is made of quartz glass. The details of the lamp 2, which may be a low-pressure mercury amalgam discharge lamp in this embodiment, are generally known. An end piece 4 of the assembly comprises a socket 5 for connecting the lamp 2 to an external power supply. The sleeve tube 3 has a closed end 6 and an open end 7, and the open end 7 is held inside the end piece 4 and hermetically sealed therein by, for examples, O-rings 8. The sleeve 3 and the end piece 4 define an inner volume of the lamp assembly 1. The end piece 4 is completely watertight and gas-tight, so that the lamp assembly 2 can be operated under water, as is usually the case.

However, the end piece 4 that is shown in FIG. 1 has a dedicated port 9 for attachment of a pneumatic hose (not shown here). The port 9 contains an open channel for the pneumatic connection between the volume inside the sleeve tube and a pneumatic tubing that may be connected to the port 9. Thus, the port can be utilized to attach a device for monitoring the pressure inside the sleeve tube or, more precisely, register pressure changes and, if a threshold is reached, generate a signal accordingly. It should be understood that the end piece 4 having the port 9 can be retrofitted to all existing lamp assemblies with the same outer diameter of the sleeve tube. Since the sleeve tubes are in practice often of the same diameter, only very few types of end pieces may have to be provided to be able to retrofit a wide variety of UV water disinfection plants.

Figure 2:
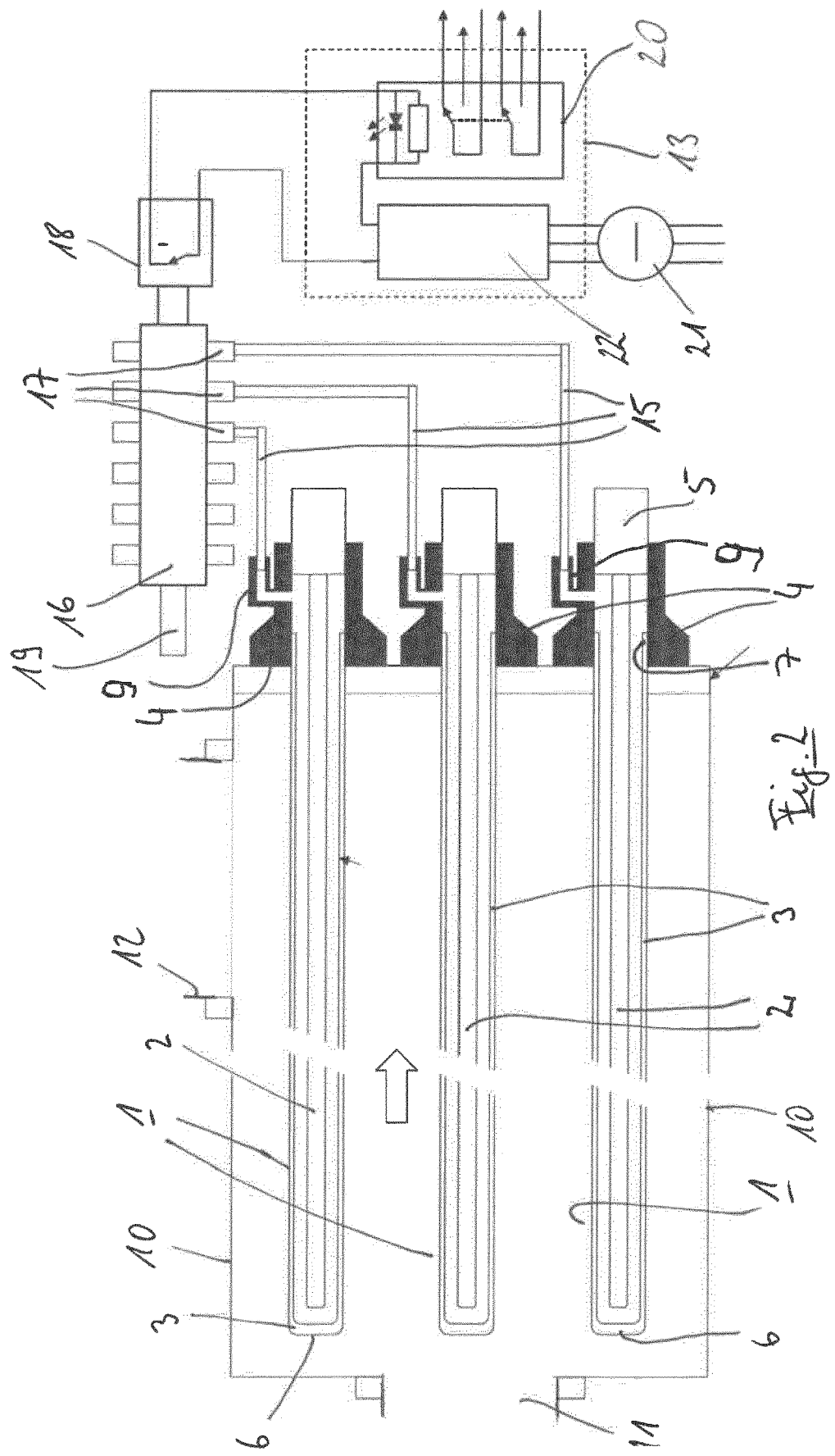
FIG. 2: a schematic layout of a UV disinfection system with multiple UV lamp assemblies.

FIG. 2 shows a schematic layout of a UV disinfection system with multiple UV lamp assemblies 1. A number of lamp assemblies 1 (three in this case) are mounted in a common reactor chamber 10 for treating a flow of water that enters the reactor chamber 10 through an inlet port 11 and which is discharged through an outlet port 12. The inlet port 11 and the outlet port 12 are connected to valves (not shown) which are adapted to shut off or open the respective ports under the control of a control unit 13. A number of UV disinfection systems may be combined to form a UV disinfection plant. This may be necessary if the capacity of one system is not sufficient to handle the total demand. In this case, several systems may be implemented to work in parallel lines or channels.

Each lamp assembly 1 shows the port 9, which is connected to a pneumatic tubing 15. The pneumatic tubings 15 are individually attached to a common manifold 16 through individual non-return valves 17. Each non-return valve 17 allows overpressure to enter the manifold 16 from a pressurized tubing 15, and blocks pressurized fluid to proceed from the manifold 16 into other non-pressurized tubings. A pressure switch 18 is connected to the manifold 16. The switch 18 is shown in its normally closed state here. Other embodiments may utilize a normally open switch type instead. When the manifold 16 is pressurized, the switch 18 opens, which can be read-out by subsequent electronics. A manually operable pressure release valve 19 is also attached to the manifold 16. This valve 19 can be operated to release pressure from the manifold 16 in case it has been pressurized due to a glass break or due to a test condition.

In this embodiment, the control unit 13 is a low voltage control unit which operates e.g. at 24 Volts. With the normally closed pressure switch 18, the control unit 13 holds a relay 20, which will automatically switch to another state once the pressure switch opens. The relay 20 can freely be used to generate an alarm, trigger a message to operating personnel or any other desired action. A mains input isolator 21 and a 24 Volts ac/dc-converter 22 may be of any known type.

Figure 3:
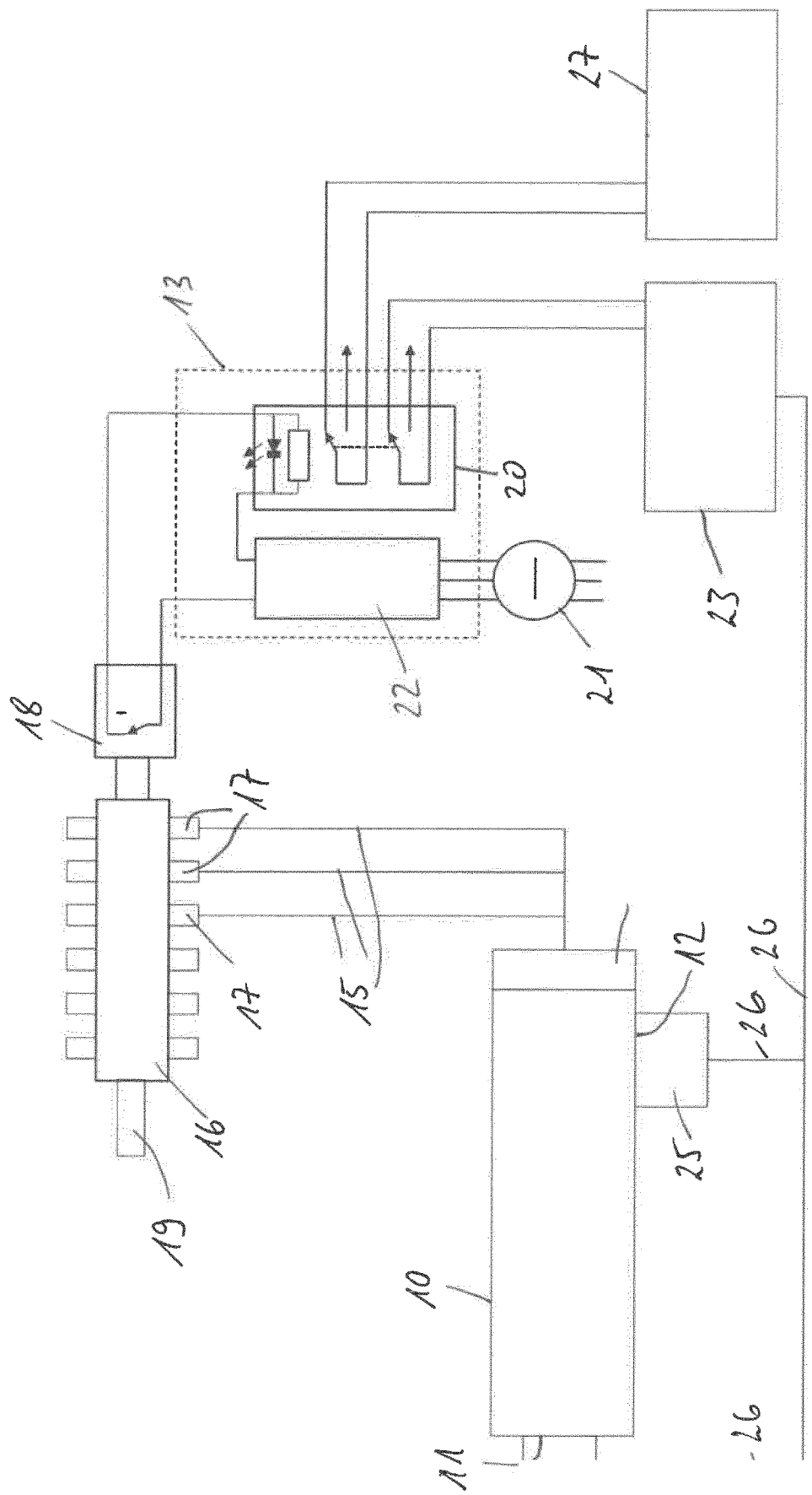
FIG. 3: a schematic layout of a plant with glass break detection and safety shutdown functionality.

FIG. 3 shows a schematic layout of a plant with glass break detection and safety shutdown functionality. The basic layout is like already described with reference to FIG. 2, and like elements are marked with the same reference numerals.

The reactor chamber 10 is one of a number of essentially identical chambers which are mounted in parallel. The chamber 10 illustrated in FIG. 2 is an example that shows three lamp assemblies, hence the figure shows three pneumatic tubings 15 are connected to the manifold 16. The number of lamp assemblies can vary in number and configuration. The sleeve break detection system is scalable to cater for any number of lamps and chambers by either installing an additional system, expanding or "daisy-chained" together without non-return valves, so that their interior is at the same pressure anytime.

FIG. 3 shows a typical plant controller 23 configuration that detects the state of relay 20 and operates a fluid inlet valve 24 and/or a fluid outlet valve 25 via electric lines 26. The first plant controller 23 is thus enabled to close the fluid valves 24 and 25 depending on the switch state of relay 20, and consequently of pressure switch 18. A second plant controller 27 reads out another set of contacts of relay 20 and can perform other necessary actions upon a change of the switch state of relay 20 and pressure switch 18.

In operation, in a preferred embodiment, the reactor chamber 10 is filled with water at an elevated pressure, while the internal volume of the sleeve 3 is at atmospheric pressure. The same atmospheric pressure is found in the tubings 15 and inside the manifold 16. The pressure switch 18 is closed under these conditions. The UV lamps are operated to disinfect the water flow through the reactor chamber 10.

A glass break may occur due to foreign objects in the water flow and/or water hammer events. Such a sleeve break would give access of the pressurized water body to the inside volume of the (then cracked or broken) sleeve and, through the individual port 9 of the defunct lamp assembly, to the pneumatic tubing 15 which is attached to that port. The pressure rises in the manifold 16 and, above a pre-selected threshold, pressure switch 18 opens. The other tubings 15 are not pressurized because of the non-return valves 17 that are fitted to the manifold. This is especially important in case of water entering the manifold 16. Consequently, the relay 20 in the control unit 13 is switched and the plant controllers 23 and 27 take the intended action, for example the first plant controller 23 closes the valves 24 and 25 and shuts down the power supply to the lamp units 1 of the affected chamber 10, while the second plant controller 27 power up another set of UV lamp units in a parallel chamber (not shown here) and, after the set of lamp units has started, opens the inlet and outlet valves of the other chamber to continue the operation of the plant. An alarm will be generated, and service personnel can change the affected lamp unit. After the repair, pressure relief valve 19 is operated to release the pressure that is still present in the manifold 16 and operation can return to normal.

FIG. 4 shows the pressure p inside the manifold vs. time of operation in arbitrary units. The units could be hours t and bars p for example. Starting at t=0, the operation of the lamp begins at an internal pressure in the sleeves and inside the manifold of, e.g., 0.6 bars. During operation, the pressure in the sleeves rises to 1.0 bars due to the temperature increase caused by the heat that the lamps generate, or also maybe due to a rise in the water temperature over time. The pressure inside the manifold rises accordingly but cannot drop because of the non-return valves that prevent air flowing back into the sleeves when the temperature and the pressure in the sleeves drop. In this example, at 7 hours of operation, one sleeve breaks and causes an immediate rise in pressure to the water pressure in the reactor, which in this example is 6 bars. The alarm is produced, and personnel is replacing the lamp unit. During this time, the pressure in the manifold is constant at 6 bars. After the maintenance is completed after 8 hours of operation time, the service person operates the pressure release valve to reset the pressure in the manifold and consequently the alarm condition. Normal operation can commence. It is not only the high absolute pressure inside the manifold that indicates a sleeve break, but also the steep gradient of the rising pressure which occurs at 7 hours of operation in this example. Depending on the type of pressure sensing means, one or both conditions can be monitored and taken as an indication of a sleeve break, alone or in combination.

The use of pressure to detect a sleeve break eliminates the risk of not detecting an alarm due to water not coming into contact with electrical parts due to air locks and in the case where the lamps are not lit because the reactor is in standby, or the lamp is not operational so there is not electrical current to create a fault, the pressure change will still be detected and the alarm raised in the event of a sleeve break.

The use of pressure also helps with falsely reporting alarms, where if there is an electrical fault such as a faulty lamp, the system will be in the non-alarm state giving assurance that the sleeve is intact, and the lamp replacement can be scheduled saving downtime and emergency call outs.

The invention claimed is:

1. A UV disinfection system, comprising:
   at least one UV lamp assembly, each UV lamp assembly comprising a sleeve surrounding a UV lamp and defining an inner volume,
   at least one pressure sensing means, and
   at least one non-return valve connecting the inner volume of the sleeve to the pressure sensing means;
   wherein the UV disinfection system is configured to detect breakage of the sleeve by detecting a change in pressure at the at least one pressure sensing means.

2. The UV disinfection system of claim 1, wherein the pressure sensing means comprises a pressure switch, a pressure transducer, or a combination thereof.

3. The UV disinfection system of claim 1, further comprising an interface configured to directly or indirectly connect a sleeve breakage alarm to the UV disinfection system.

4. The UV disinfection system of claim 3, wherein the sleeve breakage alarm comprises a passive controller having an open or closed contact to a subsequent user operated controller.

5. The UV disinfection system of claim 1, further comprising a fluid inlet valve for controlling fluid entering the UV disinfection system, a fluid outlet valve for controlling fluid leaving the UV disinfection system, or a combination thereof.

6. The UV disinfection system of claim 5, wherein:
i) the pressure sensing means is configured to directly control at least one of the fluid inlet valve and the fluid outlet valve, wherein the pressure sensing means comprises a pressure switch, a pressure transducer, or a combination thereof;
ii) the UV disinfection system further comprises a controller configured to indirectly control the at least one of the fluid inlet valve, the fluid outlet valve, or combination thereof, or
iii) a combination of (i) and (ii).

7. The UV disinfection system of claim 1, wherein the pressure sensing means is connected directly or indirectly to the inner volume of the sleeve by a passage.

8. The UV disinfection system of claim 7, wherein the passage comprises tubing.

9. The UV disinfection system of claim 8, wherein the tubing comprises pneumatic tubing.

10. A break detection device for a UV disinfection system having at least one UV lamp unit with a sleeve defining an inner volume surrounding the at least one UV lamp, the break detection device comprising:
a pressure sensing means;
at least one tubing providing direct or indirect communication between the pressure sensing means and the inner volume of the sleeve; and
a non-return valve disposed between the inner volume of the sleeve and the pressure sensing means.

11. The break detection device of claim 10, wherein the UV disinfection system comprises at least two UV lamp units, each UV lamp unit having a corresponding sleeve and a corresponding inner volume, and the at least one tubing comprises at least two tubings, each tubing pneumatically connected between the corresponding inner volume of one of the at least two UV lamp units and a manifold having two or more pneumatic ports.

12. The break detection device of claim 11, further comprising a non-return valve disposed between the inner volume of each corresponding sleeve and the pressure sensing means, the at least one nonreturn valve is disposed so that a fluid can unidirectionally pass from each of the at least two tubings into the manifold.

13. The break detection device of claim 12, wherein the manifold comprises a pressure release valve adapted to de-pressurize the manifold.

14. The break detection device of claim 12, wherein the manifold comprises a pressure test port adapted to pressurize the manifold.

15. A UV water treatment plant comprising the UV disinfection system of claim 1.

16. A UV water treatment plant comprising the break detection device of claim 10.

\* \* \* \* \*